No. 787,734. Patented April 18, 1905.

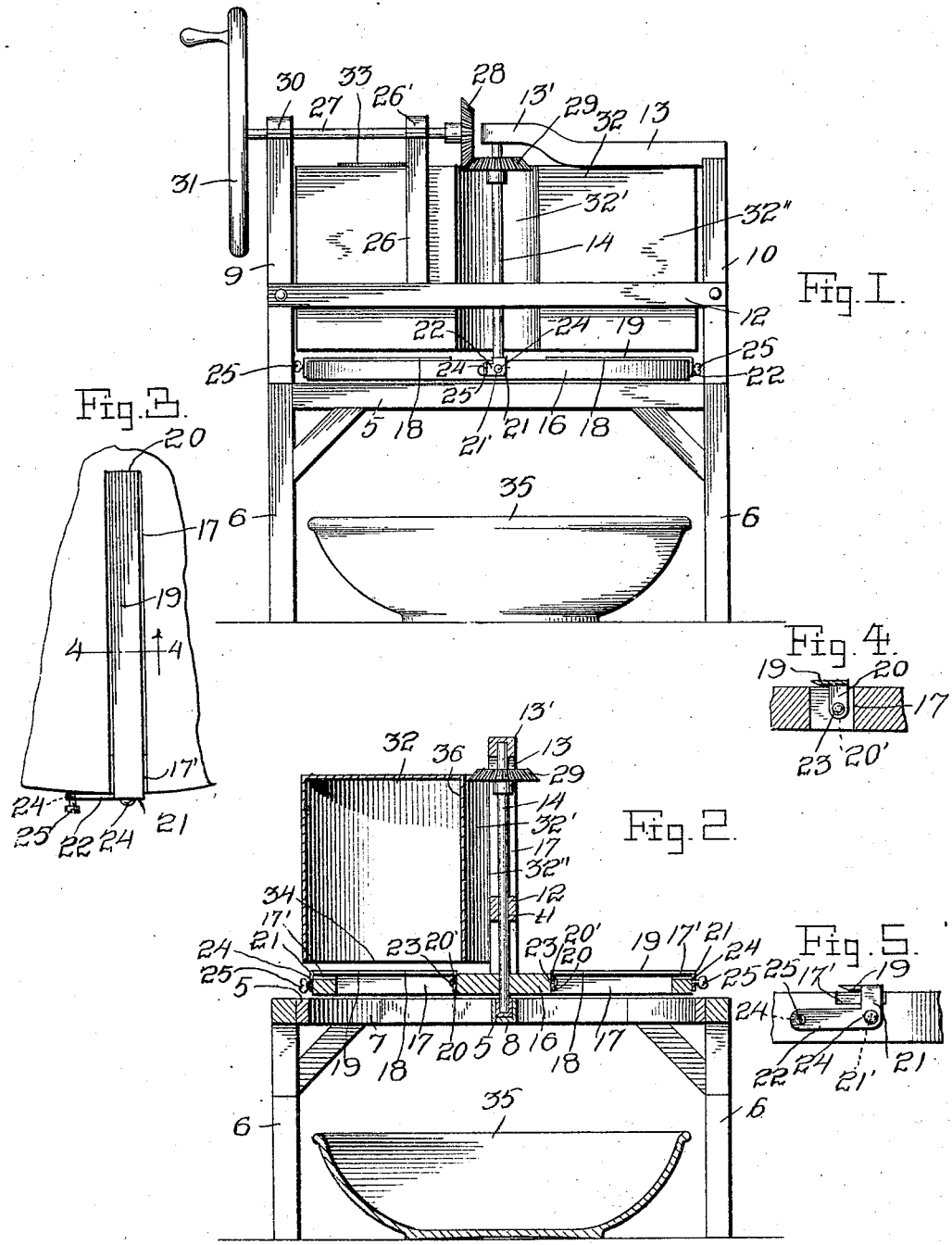

UNITED STATES PATENT OFFICE.

JACOB J. DRONG, OF BROWERVILLE, MINNESOTA.

VEGETABLE-CUTTER.

SPECIFICATION forming part of Letters Patent No. 787,734, dated April 18, 1905.

Application filed May 9, 1904. Serial No. 207,098.

*To all whom it may concern:*

Be it known that I, JACOB J. DRONG, a citizen of the United States, residing at Browerville, in the county of Todd, State of Minnesota, have invented certain new and useful Improvements in Vegetable-Cutters; and I do hereby declare the following to be a full, clear, and exact description of the invention, such as will enable others skilled in the art to which it appertains to make and use the same.

This invention relates to vegetable-cutters, and has for its object to provide a cutter which will quickly and efficiently perform the operation of cutting vegetables and which will perform this operation without danger of cutting the hands of the operator.

In the drawings forming a portion of this specification, and in which like numerals of reference indicate similar parts in the several views, Figure 1 is a side elevation of the cutter. Fig. 2 is a longitudinal section. Fig. 3 is a plan view of a part of the cutter-disk, illustrating one of the knives. Fig. 4 is a detail section across the slot on line 4 4 of Fig. 3. Fig. 5 is an enlarged edge view of the disk, showing the end of a knife.

Referring now to the drawings, there is shown a platform 5, having supporting-legs 6 and a central circular opening 7, across which there extends a transverse member 8. Extending upwardly at opposite points upon the sides of the platform are uprights 9 and 10, which are connected above the platform by a transverse member 12, having an opening 11 therethrough, which alines with a bearing 15 in the member 8, both the opening and the bearing being concentric with the circular opening 7. Extending laterally from the upright 10 in the direction of the upright 9 is an arm 13, having a bearing 13' therein, in which is journaled a shaft 14, which is engaged in the opening 11 and has its lower end journaled in the bearing 15.

Secured to the shaft 14 between the member 12 and the platform is a knife-carrying disk 16, having radial slots 17 therethrough, in which are pivotally-mounted knives 18, the cutting edges of which project upwardly above the upper face of the disk. Each of these knives consists of a blade 19, having downwardly-turned ends 20 and 21, which are provided with perforations 20' and 21', respectively. These knives are disposed with the perforations 20' engaged with pivot-pins 23, which project from the inner ends of the slots 17, and with the perforations 21' are engaged similar pins 24, projecting from the periphery of the disk in a line radially of the disk with the pins 23. The blades 19 thus lie in the slots 17 and in grooves 17', which form continuations thereof and which communicate with the periphery of the disk 16, with their cutting edges projecting therefrom in the same direction. The blades are thus movable pivotally to cause their cutting edges to project above the upper surface of the disk to a greater or less degree, as desired. The angular ends 21 of the knives have projections 22, which extend over the periphery of the disk, which is engaged by set-screws 25, disposed in threaded perforations 24 to hold the knives at different points of their pivotal movement.

Projecting upwardly from the member 12 is a block 26, having a bearing 26' therein, in which there is mounted a shaft 27, which is also engaged in a bearing 30 in the upper end of the upright 9. The shaft 27 carries on its end beyond the block 26 a gear 28, which meshes with a gear 29 on the shaft 14, and at its outer end the shaft 27 is provided with a crank 31, by which it may be revolved to revolve the disk 16.

Secured to the member 12 is a receptacle 32, having an opening 33 for the introduction of the vegetables to be cut, the receptacle having an opening 34 in its bottom, which permits the vegetables to be engaged by the blades 19 as the disk is revolved, this engagement resulting in the slicing of the vegetables, the slices falling through the slots 17 to a receptacle 35 beneath the platform. As shown, the receptacle 32 is semicircular in shape and has a recess 32', which receives the shaft 14, the receptacle being attached to the member 12 at its flat face 32''. The result is that any matter placed in the receptacle is carried around by the disk until it reaches the inner surface of the flat face 32'' at one side of a projection 36, which extends into the receptacle and in which the recess 32' is formed, in which position the vegetable presents sufficient resistance to the blades 19 to permit of the slicing operation.

What is claimed is—

1. A vegetable-cutter including a revoluble disk having radial slots, blades pivoted in the slots with their cutting edges above the surface of the disk and arranged for movement of said edges vertically, said blades having ears extending over the periphery of the disk, and set-screws engaged in the ears and arranged for engagement of the periphery of the disk to hold the blades at different points of their pivotal movement.

2. In a vegetable-cutter, the combination with a platform having an opening therethrough, of a disk revolubly mounted above the opening and having radial slots and grooves connecting the outer ends of the slots with the periphery of the disk, said grooves also communicating with the upper face of the disk, blades having downwardly-turned ends disposed in the slots and grooves with their ends pivoted to the disk one at the inner end of the slot and the other at the periphery and with their cutting edges projecting above the upper surface of the disk in the same direction, a set-screw engaged with the outer end of each blade for movement into engagement with the periphery of the disk to prevent pivotal movement of the blades, means for revolving the disk and means for holding matter in position to be engaged by the blades.

In testimony whereof I affix my signature in presence of two witnesses.

JACOB J. DRONG.

Witnesses:
J. H. SCOTT,
E. N. PERRY.